(12) United States Patent
Wen

(10) Patent No.: US 12,009,569 B2
(45) Date of Patent: Jun. 11, 2024

(54) SELF-DRIVING CONTROL DEVICE AND UNMANNED DRIVING DEVICE WITH THE SAME

(71) Applicant: GUANGZHOU XAIRCRAFT TECHNOLOGY CO., LTD., Guangzhou (CN)

(72) Inventor: Haijun Wen, Guangzhou (CN)

(73) Assignee: GUANGZHOU XAIRCRAFT TECHNOLOGY CO., LTD., Guangzhou (CN)

(*) Notice: Subject to any disclaimer, the term of this patent is extended or adjusted under 35 U.S.C. 154(b) by 301 days.

(21) Appl. No.: 17/524,131

(22) Filed: Nov. 11, 2021

(65) Prior Publication Data

US 2022/0069432 A1     Mar. 3, 2022

Related U.S. Application Data

(63) Continuation of application No. PCT/CN2020/110335, filed on Aug. 20, 2020.

(30) Foreign Application Priority Data

Dec. 19, 2019  (CN) .......................... 201922302280.2

(51) Int. Cl.
*H01Q 1/28* (2006.01)
*B64C 39/02* (2023.01)
(Continued)

(52) U.S. Cl.
CPC ......... *H01Q 1/1214* (2013.01); *H01Q 9/0407* (2013.01)

(58) Field of Classification Search
CPC .. B64C 1/34; B64C 1/36; B64C 39/02; B64C 39/024; H01Q 1/12; H01Q 1/1207;
(Continued)

(56) References Cited

U.S. PATENT DOCUMENTS 10,266,264 B2 *  4/2019  Luo ........................ B64C 39/024
10,707,564 B2 *  7/2020  Cheng .................... H01Q 21/24
(Continued)

FOREIGN PATENT DOCUMENTS

CN          206864635 U     1/2018
CN          206885325 U     1/2018
(Continued)

OTHER PUBLICATIONS

Extended European Search Report issued in counterpart European Patent Application No. 20902759.8, dated May 13, 2022.
(Continued)

*Primary Examiner* — Tho G Phan
(74) *Attorney, Agent, or Firm* — Westbridge IP LLC

(57) ABSTRACT

Provided are a self-driving control device and an unmanned driving device with the same. The self-driving control device includes a mounting base, a control device, a communication device, and an antenna assembly, the mounting base is provided with an accommodation cavity, the control device is disposed in the accommodation cavity, the communication device is disposed in the accommodation cavity and electrically connected to the control device, and the antenna assembly is mounted on the mounting base and electrically connected to the communication device.

14 Claims, 2 Drawing Sheets

(51) Int. Cl.
H01Q 1/12 (2006.01)
H01Q 9/04 (2006.01)

(58) Field of Classification Search
CPC ........ H01Q 1/1214; H01Q 1/28; H01Q 17/00; H01Q 21/24; H01Q 21/28; H01Q 9/04; H01Q 9/0407
See application file for complete search history.

(56) References Cited

U.S. PATENT DOCUMENTS

| | | | | |
|---|---|---|---|---|
| 11,171,412 | B2* | 11/2021 | Lv | ........................... H01Q 5/30 |
| 11,602,236 | B2* | 3/2023 | Anderson | ............. B64C 39/024 |
| 2013/0335089 | A1 | 12/2013 | Mes | |
| 2017/0217562 | A1 | 8/2017 | Schalla | |

FOREIGN PATENT DOCUMENTS

| | | | |
|---|---|---|---|
| CN | 207346069 | U | 5/2018 |
| CN | 207559039 | U | 6/2018 |
| CN | 109455291 | A | 3/2019 |
| CN | 208616186 | U | 3/2019 |
| CN | 209290711 | U | 8/2019 |
| CN | 210864418 | U | 6/2020 |
| JP | 2018117268 | A | 7/2018 |
| KR | 20180089815 | A | 8/2018 |

OTHER PUBLICATIONS

International Search Report issued in corresponding PCT Application No. PCT/CN2020/110335, dated Nov. 10, 2020.
Notice of Reasons for Refusal issued in counterpart Japanese Patent Application No. 2021-567016, dated Dec. 20, 2022.

* cited by examiner

SELF-DRIVING CONTROL DEVICE AND UNMANNED DRIVING DEVICE WITH THE SAME

CROSS-REFERENCE TO RELATED APPLICATIONS

This application is a continuation application of International Application No. PCT/CN2020/110335 filed on Aug. 20, 2020, which claims priority to Chinese Patent Application No. 201922302280.2 filed on Dec. 19, 2019, the entire contents of which are herein incorporated by reference.

TECHNICAL FIELD

This application relates to the field of unmanned driving device technologies, and in particular to a self-driving control device and an unmanned driving device with the same.

BACKGROUND

Unmanned driving devices are widely used in many fields owe to their advantages such as flexible maneuverability, fast response, and low operation requirements.

SUMMARY

This application aims to solve one of the foregoing technical problems in the prior art at least to a certain extent. Therefore, this application provides a self-driving control device. The self-driving control device has a reasonable structure design and ensures high communication quality and stable signal reception.

This application further provides an unmanned driving device provided with the foregoing self-driving control device.

The self-driving control device according to the embodiments of this application includes: a mounting base, a control device, a communication device and an antenna assembly, the mounting base is provided with an accommodation cavity, the control device is disposed in the accommodation cavity, the communication device is disposed in the accommodation cavity and electrically connected to the control device, and the antenna assembly is mounted on the mounting base and electrically connected to the communication device.

According to the self-driving control device in the embodiments of this application, both the control device and the communication device are located in the accommodation cavity of the mounting base. Therefore, the mounting base may support and protect the control device and the communication device, to avoid external interference in operation of the control device and the communication device, thereby ensuring high reliability of the operation of the control device and the communication device. In addition, the antenna assembly is mounted on an outer side of the mounting base, thereby providing mounting support for the antenna assembly, ensuring that the antenna assembly may better receive a signal, and preventing interference. Therefore, the self-driving control device has the reasonable structure design, the high communication quality, and the stable signal reception.

According to some embodiments of this application, the antenna assembly includes: an antenna bracket, a first antenna and a second antenna, the antenna bracket is fixed on the mounting base, the first antenna is mounted on the antenna bracket, the first antenna is electrically connected to the communication device, the second antenna is mounted on the antenna bracket, and the second antenna is electrically connected to the communication device.

In some embodiments of this application, the antenna bracket includes: a bracket body, a first mounting part and a second mounting part, the first mounting part is located at one end of the bracket body, the second mounting part is located at the other end of the bracket body, and the first antenna and the second antenna are disposed at each of the first mounting part and the second mounting part.

In some embodiments of this application, a wire trough is formed in one side, facing the mounting base, of the antenna bracket, and both the first antenna and the second antenna that are located at each of the first mounting part and the second mounting part are wired through the wire trough to be electrically connected to the communication device.

In some embodiments of this application, the mounting base includes: a mounting housing and a fixed bracket, the accommodation cavity is formed in the mounting housing, the fixed bracket is placed in the accommodation cavity and fixed to an inner wall of the mounting housing, and the fixed bracket divides the accommodation cavity into a control device mounting cavity for accommodating the control device and a communication device mounting cavity for accommodating the communication device.

In some embodiments of this application, the fixed bracket includes: a support plate and a support leg, one end of the support leg is fixed to the support plate, the other end of the support leg is adapted to be fixed to an inner wall of the mounting housing, to form the control device mounting cavity between the support plate and the inner wall of the mounting housing, and the communication device mounting cavity is formed in one side, away from the control device mounting cavity, of the support plate.

In some embodiments of this application, the communication device includes: a first communication device and a second communication device, the fixed bracket further includes: a connection plate, the connection plate is located in the communication device mounting cavity, the first communication device and the second communication device are respectively located on two sides of the connection plate, the first communication device is adapted to be connected to the first antenna and the second antenna that are located at the first mounting part, and the second communication device is adapted to be connected to the first antenna and the second antenna that are located at the second mounting part.

In some embodiments of this application, the fixed bracket further includes: a fixing plate, the fixing plate is disposed at one end, away from the support plate, of the connection plate; and the antenna assembly further includes: a third antenna, the third antenna is fixed on the fixing plate and electrically connected to the communication device.

In some embodiments of this application, the fixing plate includes: a fixed connection plate, a first bracket plate and a second bracket plate, the fixed connection plate is connected to the connection plate, the first bracket plate is located at one end of the fixed connection plate, the second bracket plate is located at the other end of the fixed connection plate, free ends of both the first bracket plate and the second bracket plate extend towards the support plate, an angle between the first bracket plate and the second bracket plate is greater than 90 degrees and smaller than 180 degrees, and the third antenna is a patch antenna and is attached onto the first bracket plate and the second bracket plate.

An unmanned driving device according to an embodiment in another aspect of this application includes the foregoing self-driving control device.

The unmanned driving device and the foregoing self-driving control device have the same advantages as those in the prior art, and details are not repeated herein again.

Additional aspects and advantages of this application are given partially in the following descriptions, and partially become more apparent from the following descriptions, or understand through practice of this application.

BRIEF DESCRIPTION OF DRAWINGS

The following descriptions of the embodiments with reference to the accompanying drawings make the foregoing and/or additional aspects and advantages of this application more apparent or easy to understand.

DETAILED DESCRIPTION OF THE EMBODIMENTS

Figure 1:
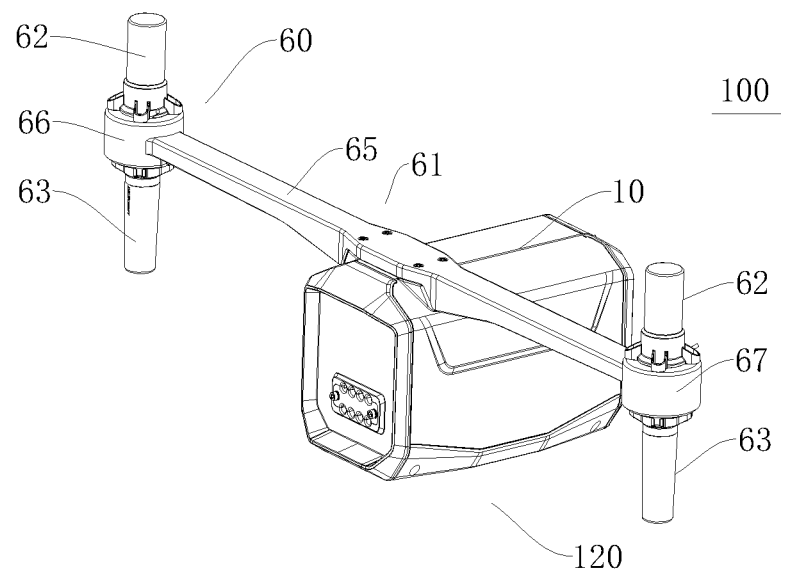
FIG. 1 is a stereoscopic schematic diagram of a self-driving control device.

Embodiments of this application are described below in detail, and the embodiments are shown in the accompanying drawings, identical or similar reference numerals throughout the specification represent identical or similar elements or the elements having identical or similar functions. The embodiments described below with reference to the accompanying drawings are exemplary and only used to explain this application, and shall not be understood as a limitation to this application.

In the description of this application, it should be understood that, orientations or position relationships indicated by the terms "longitudinal", "lateral", "length", "width", "upper", "lower", "front", "rear", "left", "right", "vertical", "horizontal", "top", "bottom", "inner", "outer", and the like are orientations or position relationships based on the accompanying drawings and are merely intended to facilitate the description of this application and simplify the description, rather than indicating or implying that the referred device or element must have a particular orientation or be constructed and operated in a particular orientation. Therefore, these terms should not be interpreted as limiting this application.

In this application, unless expressly specified and defined otherwise, the terms "mounted", "join", "connection", and "fixed" should be understood in a broad sense. For example, "connection" may be a fixed connection, a detachable connection, or an integral connection; or may be a mechanical connection, an electrical connection, or a mutual communication; or may be a direct connection or an indirect connection by means of an intermediate medium; or may be an internal communication or an interactive relationship between two elements. For persons of ordinary skill in the art, specific meanings of the foregoing terms in this application may be understood based on specific situations.

Driving of the unmanned driving device is controlled by a self-driving control device. Therefore, to ensure high driving reliability of the unmanned driving device, signal reception stability of the self-driving control device needs to be high. However, a existing self-driving control device has an unreasonable structure design, low communication quality, and low signal reception capability, which cannot guarantee operation stability of the unmanned driving device.

The self-driving control device 100 according to the embodiments of this application is described below in detail with reference to FIG. 1 to FIG. 5.

Figure 2:
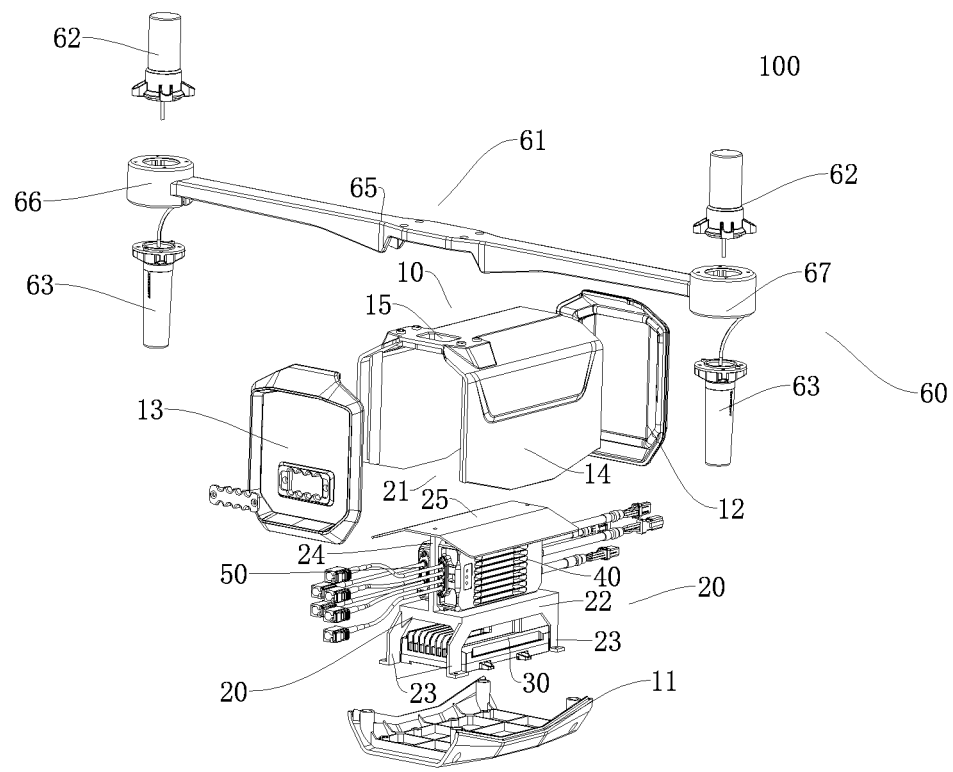
FIG. 2 is a exploded schematic diagram of a self-driving control device.

Referring to FIG. 1 and FIG. 2, the self-driving control device 100 according to the embodiments of this application may include: a mounting base 120, a control device 30, a communication device and an antenna assembly 60. The antenna assembly 60 is configured to receive a signal sent by a console. The communication device is configured to get in contact with the console. The control device 30 is configured to control an unmanned driving device to perform an action.

Specifically, as shown in FIG. 2, the mounting base 120 is provided with an accommodation cavity 21. The control device 30 is disposed in the accommodation cavity 21. The communication device is disposed in the accommodation cavity 21 and electrically connected to the control device 30. The antenna assembly 60 is mounted on the mounting base 120 and electrically connected to the communication device.

In other words, both the control device 30 and the communication device are located in the accommodation cavity 21 of the mounting base 120. Therefore, the mounting base 120 may support and protect the control device 30 and the communication device, to avoid external interference in operation of the control device 30 and the communication device, thereby ensuring high reliability of the operation of the control device 30 and the communication device. In addition, the antenna assembly 60 is mounted on the mounting base 120, thereby providing mounting support for the antenna assembly 60. In a specific embodiment, the antenna assembly 60 is located on an outer side of the mounting base 120, thereby ensuring that the antenna assembly 60 may better receive a signal, and preventing interference.

According to the self-driving control device 100 in the embodiments of this application, both the control device 30 and the communication device are located in the accommodation cavity 21 of the mounting base 120. Therefore, the mounting base 120 may support and protect the control device 30 and the communication device, to avoid the external interference in the operation of the control device 30 and the communication device, thereby ensuring the high reliability of the operation of the control device 30 and the communication device. In addition, the antenna assembly 60 is mounted on the outer side of the mounting base 120, thereby providing the mounting support for the antenna assembly 60, ensuring that the antenna assembly 60 may better receive the signal, and preventing the interference. Therefore, the self-driving control device 100 has a reasonable structure design, high communication quality, and stable signal reception.

In some embodiments of this application, as shown in FIG. 1 and FIG. 2, the antenna assembly 60 may include: an antenna bracket 61 and a first antenna 62. The antenna bracket 61 is fixed on the mounting base 120. The first antenna 62 is mounted on the antenna bracket 61, and the first antenna 62 is electrically connected to the communication device. In other words, the antenna bracket 61 provides support for mounting the first antenna 62 on the mounting base 120, thereby ensuring that a signal received by the first antenna 62 may be successfully transmitted to the communication device.

In some embodiments of this application, as shown in FIG. 1 and FIG. 2, the antenna assembly 60 may further include: a second antenna 63. The second antenna 63 is mounted on the antenna bracket 61, and the second antenna 63 is electrically connected to the communication device.

In other words, the second antenna 63 is also fixed on the antenna bracket 61 and electrically connected to the communication device. By disposing the first antenna 62 and the second antenna 63, it can be ensured that the antenna assembly 60 has a wider signal reception range and a higher receiving capability, further ensuring higher quality of a signal received by the self-driving control device 100, and providing a basis for high operation stability of the self-driving control device 100.

Figure 5:
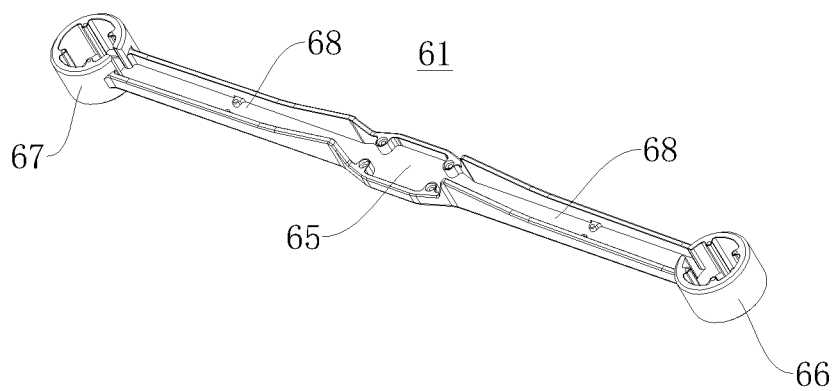
FIG. 5 is a schematic structural diagram of an antenna bracket.

In some embodiments of this application, as shown in FIG. 1, FIG. 2, and FIG. 5, the antenna bracket 61 may include: a bracket body 65, a first mounting part 66, and a second mounting part 67. The first mounting part 66 is located at one end of the bracket body 65. The second mounting part 67 is mounted at the other end of the bracket body 65. The first antenna 62 and the second antenna 63 are disposed at each of the first mounting part 66 and the second mounting part 67, i.e., the first mounting part 66 and the second mounting part 67 are respectively located at two ends of the bracket body 65, and the first antenna 62 and the second antenna 63 are disposed at each of the first mounting part 66 and the second mounting part 67. Therefore, a signal reception range and a signal reception capability are further increased, ensuring that the self-driving control device 100 has a high signal reception capability.

It should be noted that, the terms "first", "second" and the like are only for the purpose of description and shall not be construed as indicating or implying relative importance, or implicitly indicating the number of the indicated technical features. Therefore, the features defined by "first", "second", and the like may indicate or imply that one or more features are included. In the description of this application, unless otherwise stated, the meaning of "a plurality of" means at least two, such as two or more.

Specifically, as shown in FIG. 5, a wire trough 68 is formed in the antenna bracket 61. The first antenna 62 and the second antenna 63 that are located at each of the first mounting part 66 and the second mounting part 67 may be wired through the wire trough 68 to be electrically connected to the communication device located on the mounting base 120.

In some embodiments of this application, as shown in FIG. 2, the mounting base 120 may include: a mounting housing 10 and a fixed bracket 20. The accommodation cavity 21 is formed in the mounting housing 10. The fixed bracket 20 is placed in the accommodation cavity 21 and fixed to an inner wall of the mounting housing 10. The fixed bracket 20 divides the accommodation cavity 21 into a control device mounting cavity for accommodating the control device 30 and a communication device mounting cavity for accommodating the communication device. The control device 30 is placed in the control device mounting cavity. The communication device is placed in the communication device mounting cavity. The mounting housing 10 may enclose the fixed brackct 20, thereby protecting the control device 30 and the communication device.

Specifically, as shown in FIG. 2, the mounting housing 10 may include: a first housing body 14, a second housing body 11, a third housing body 13 and a fourth housing body 12. The first housing body 14 is a hollow cavity with a closed upper end, the second housing body 11 is fixed at a lower end of the first housing body 14, and the third housing body 13 and the fourth housing body 12 are respectively fixed at two opposite ends of the first housing body 14, so as to form a totally-enclosed cavity structure, further protecting the control device 30 and the communication device. The antenna bracket 61 may be fixed at an upper end of the mounting housing 10, and a wire through hole 15 for a connection wire of the antenna bracket 61 to penetrate through is formed in the upper end of the mounting housing 10, so that the first antenna 62 and the second antenna 63 can be electrically connected to the communication device.

Figure 3:
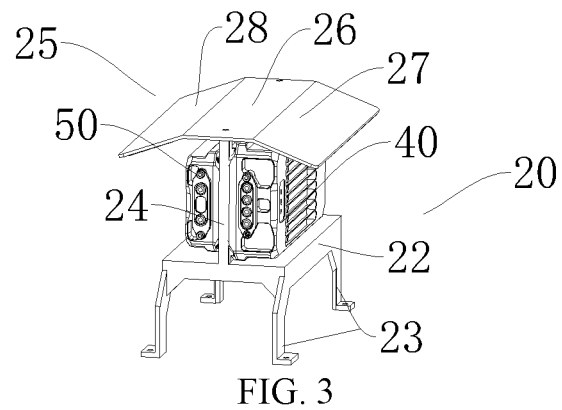
FIG. 3 is a schematic diagram of cooperation between a fixed bracket and a communication device.
Figure 4:
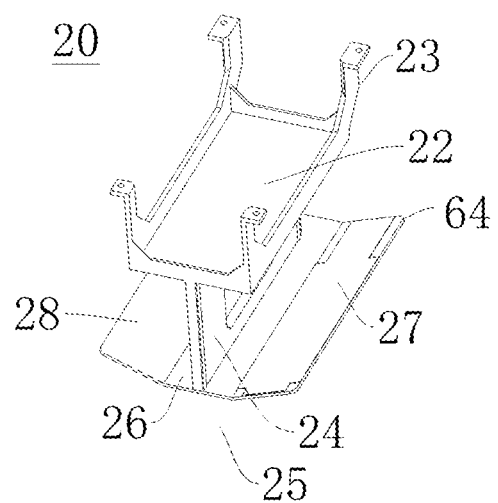
FIG. 4 is a schematic structural diagram of a fixed bracket.

In some embodiments of this application, as shown in FIG. 3 and FIG. 4, the fixed bracket 20 may include: a support plate 22 and a support leg 23. One end of the support leg 23 is fixed to the support plate 22, and the other end of the support leg 23 is adapted to be fixed to an inner wall of the mounting housing 10, to form the control device mounting cavity between the support plate 22 and the inner wall of the mounting housing 10. The support plate 22 and the support leg 23 may form a structure like a table and stool, a plurality of support legs 23 are located at a periphery of the support plate 22, and the other ends of the support legs 23 are fixed to the inner wall of the mounting housing 10, thereby supporting the fixed bracket 20. In addition, a gap is formed between the support plate 22 and the inner wall of the mounting housing 10, to form the control device mounting cavity, thereby ensuring that the mounting base 120 may fix the control device 30. Moreover, the control device 30 is located between the support plate 22 and the inner wall of the mounting housing 10, thereby facilitating shock absorption of the control device 30, and ensuring a better operation environment and high operation reliability of the control device 30.

In the embodiments shown in FIG. 3 and FIG. 4, there are four support legs 23. The support plate 22 is a quadrilateral plate. The four support legs 23 are located at four vertices of the support plate 22, and the control device mounting cavity is formed between the support plate 22 and the second housing body 11.

In addition, the communication device mounting cavity is formed in one side, away from the control device mounting cavity, of the support plate 22, thereby ensuring that the mounting base 120 may fix the communication device.

In some embodiments of this application, as shown in FIG. 2 and FIG. 3, the communication device includes: a first communication device 40 and a second communication device 50, i.e., the communication device is composed of the first communication device 40 and the second communication device 50. In a specific embodiment, the first communication device 40 may be connected to the first antenna 62 and the second antenna 63 that are located at the first mounting part 66, and the second communication device 50 may be connected to the first antenna 62 and the second antenna 63 that are located at the second mounting part 67.

Specifically, as shown in FIG. 3 and FIG. 4, the fixed bracket 20 further includes: a connection plate 24. The connection plate 24 is located in the communication device mounting cavity. The first communication device 40 and the second communication device 50 are respectively located on two sides of the connection plate 24, i.e., the connection plate 24 divides the communication device mounting cavity into a first mounting cavity for accommodating the first communication device 40 and a second mounting cavity for accommodating the second communication device 50. The first communication device 40 and the second communication device 50 are respectively located in the first mounting cavity and the second mounting cavity, and both the first communication device 40 and the second communication device 50 may be fixedly connected to the connection plate 24, thereby providing support for fixing the communication device.

In some embodiments of this application, as shown in FIG. 3 and FIG. 4, the fixed bracket 20 further includes: a fixing plate 25. The fixing plate 25 is disposed at one end, away from the support plate 22, of the connection plate 24. The fixing plate 25 is located above the connection plate 24. The communication device mounting cavity is formed between the fixing plate 25 and the support plate 22, so that the fixing plate 25 may provide upper protection for the communication device located in the communication device mounting cavity.

In addition, the fixing plate 25, the connection plate 24, the support plate 22 and the support leg 23 form an integrated piece. Therefore, the self-driving control device 100 may be assembled only by fixedly connecting the mounting housing 10 to the fixed bracket 20, and then mounting the control device 30, the communication device, and the antenna bracket 61. The assembly is simple, and the connection is firm.

In some embodiments of this application, as shown in FIG. 4, the antenna assembly 60 may further include: a third antenna 64. The third antenna 64 is fixed on the fixing plate 25 and electrically connected to the communication device. By disposing third antenna 64, a signal reception capability of the self-driving control device 100 is further enhanced.

In some embodiments of this application, as shown in FIG. 3 and FIG. 4, the fixing plate 25 may include: a fixed connection plate 26, a first bracket plate 27 and a second bracket plate 28. The fixed connection plate 26 is connected to the connection plate 24. The first bracket plate 27 is located at one end of the fixed connection plate 26. The second bracket plate 28 is located at the other end of the fixed connection plate 26. Free ends of both the first bracket plate 27 and the second bracket plate 28 extend towards the support plate 22. An angle between the first bracket plate 27 and the second bracket plate 28 is greater than 90 degrees and smaller than 180 degrees. The third antenna 64 is a patch antenna and is attached onto the first bracket plate 27 and the second bracket plate 28. I.e., the first bracket plate 27 and the second bracket plate 28 of the fixing plate 25 are obliquely disposed, so that a signal reception range of the antenna is extended, further extending a signal reception range of the self-driving control device 100.

In a specific embodiment, the first antenna 62 may be a directional antenna (for example, a Real Time Kinematic (RTK) antenna), and the second antenna 63 or the third antenna 64 may be a communication antenna (for example, a 4G antenna). Therefore, it can be ensured that the self-driving control device 100 may simultaneously receive a locating signal and a communication signal, feedback its position in time, and take a next action in time, thereby ensuring high operation reliability of the self-driving control device 100.

An unmanned driving device according to an embodiment in another aspect of this application includes the foregoing self-driving control device 100.

In a specific embodiment, the unmanned driving device may be an unmanned vehicle, an unmanned air vehicle, an unmanned underwater vehicle, or the like.

In the description of this specification, the description with reference to the terms "an embodiment", "some embodiments", "exemplary embodiments", "an example", "specific examples", "some examples", or the like means specific features, structures, materials or characteristics described in combination with the embodiments or examples are included in at least one embodiment or example of this application. In this specification, the schematic representation of the foregoing terms does not necessarily refer to a same embodiment or example. Moreover, the described specific features, structures, materials, or characteristics may be combined in any one or more embodiments or examples in an appropriate manner.

Although the embodiments of this application have been illustrated and described above, persons of ordinary skill in the art may understand that various changes, modifications, substitutions, and variations may be made to these embodiments without departing from the principle and essence of this application, and the scope of this application is limited by the claims and their equivalents.

What is claimed is:

1. A self-driving control device, comprising:
a mounting base provided with an accommodation cavity;
a control device disposed in the accommodation cavity;
a communication device disposed in the accommodation cavity and electrically connected to the control device; and
an antenna assembly mounted on the mounting base and electrically connected to the communication device;
wherein the antenna assembly comprises:
an antenna bracket fixed on the mounting base;
a first antenna mounted on the antenna bracket and electrically connected to the communication device; and
a second antenna mounted on the antenna bracket and electrically connected to the communication device;
wherein the antenna bracket comprises: a bracket body, a first mounting part and a second mounting part, the first mounting part is located at one end of the bracket body, the second mounting part is located at the other end of the bracket body, and the first antenna and the second antenna are disposed at each of the first mounting part and the second mounting part;
wherein the mounting base comprises:
a mounting housing, in which the accommodation cavity is formed; and
a fixed bracket placed in the accommodation cavity and fixed to an inner wall of the mounting housing, and the fixed bracket divides the accommodation cavity into a control device mounting cavity for accommodating the control device and a communication device mounting cavity for accommodating the communication device.

2. The self-driving control device according to claim 1, wherein a wire trough is formed in one side, facing the mounting base, of the antenna bracket, and both the first antenna and the second antenna that are located at each of the first mounting part and the second mounting part are wired through the wire trough to be electrically connected to the communication device.

3. The self-driving control device according to claim 1, wherein the mounting housing comprises: a first housing body, a second housing body, a third housing body and a fourth housing body, the first housing body is a hollow cavity with a closed upper end, the second housing body is fixed at a lower end of the first housing body, and the third housing body and the fourth housing body are respectively fixed at two opposite ends of the first housing body.

4. The self-driving control device according to claim 1, wherein the antenna bracket is fixed at an upper end of the mounting housing, and a wire through hole for a connection wire of the antenna bracket to penetrate through is formed in the upper end of the mounting housing.

5. The self-driving control device according to claim 1, wherein the fixed bracket comprises:
a support plate; and
a support leg, wherein one end of the support leg is fixed to the support plate, the other end of the support leg is adapted to be fixed to the inner wall of the mounting housing, to form the control device mounting cavity between the support plate and the inner wall of the mounting housing, and the communication device mounting cavity is formed in one side, away from the control device mounting cavity, of the support plate.

6. The self-driving control device according to claim 5, wherein the communication device comprises: a first communication device and a second communication device, the fixed bracket further comprises: a connection plate located in the communication device mounting cavity, the first communication device and the second communication device are respectively located on two sides of the connection plate, the first communication device is adapted to be connected to the first antenna and the second antenna that are located at the first mounting part, and the second communication device is adapted to be connected to the first antenna and the second antenna that are located at the second mounting part.

7. The self-driving control device according to claim 6, wherein the fixed bracket further comprises: a fixing plate disposed at one end, away from the support plate, of the connection plate; and
the antenna assembly further comprises: a third antenna fixed on the fixing plate and electrically connected to the communication device.

8. The self-driving control device according to claim 7, wherein the fixing plate comprises: a fixed connection plate, a first bracket plate and a second bracket plate, the fixed connection plate is connected to the connection plate, the first bracket plate is located at one end of the fixed connection plate, the second bracket plate is located at the other end of the fixed connection plate, free ends of both the first bracket plate and the second bracket plate extend towards the support plate, an angle between the first bracket plate and the second bracket plate is greater than 90 degrees and smaller than 180 degrees, and the third antenna is a patch antenna and is attached onto the first bracket plate and the second bracket plate.

9. An unmanned driving device, comprising a self-driving control device, the self-driving control device comprising:
a mounting base provided with an accommodation cavity;
a control device disposed in the accommodation cavity;
a communication device disposed in the accommodation cavity and electrically connected to the control device; and
an antenna assembly mounted on the mounting base and electrically connected to the communication device;
wherein the antenna assembly comprises:
an antenna bracket fixed on the mounting base;
a first antenna mounted on the antenna bracket and electrically connected to the communication device; and
a second antenna mounted on the antenna bracket and electrically connected to the communication device;
wherein the antenna bracket comprises: a bracket body, a first mounting part and a second mounting part, the first mounting part is located at one end of the bracket body, the second mounting part is located at the other end of the bracket body, and the first antenna and the second antenna are disposed at each of the first mounting part and the second mounting part;
wherein the mounting base comprises:
a mounting housing, in which the accommodation cavity is formed; and
a fixed bracket placed in the accommodation cavity and fixed to an inner wall of the mounting housing, and the fixed bracket divides the accommodation cavity into a control device mounting cavity for accommodating the control device and a communication device mounting cavity for accommodating the communication device.

10. The unmanned driving device according to claim 9, wherein a wire trough is formed in one side, facing the mounting base, of the antenna bracket, and both the first antenna and the second antenna that are located at each of the first mounting part and the second mounting part are wired through the wire trough to be electrically connected to the communication device.

11. The unmanned driving device according to claim 9, wherein the fixed bracket comprises:
a support plate; and
a support leg, wherein one end of the support leg is fixed to the support plate, the other end of the support leg is adapted to be fixed to the inner wall of the mounting housing, to form the control device mounting cavity between the support plate and the inner wall of the mounting housing, and the communication device mounting cavity is formed in one side, away from the control device mounting cavity, of the support plate.

12. The unmanned driving device according to claim 11, wherein the communication device comprises: a first communication device and a second communication device, the fixed bracket further comprises: a connection plate located in the communication device mounting cavity, the first communication device and the second communication device are respectively located on two sides of the connection plate, the first communication device is adapted to be connected to the first antenna and the second antenna that are located at the first mounting part, and the second communication device is adapted to be connected to the first antenna and the second antenna that are located at the second mounting part.

13. The unmanned driving device according to claim 12, wherein the fixed bracket further comprises: a fixing plate disposed at one end, away from the support plate, of the connection plate; and
the antenna assembly further comprises: a third antenna fixed on the fixing plate and electrically connected to the communication device.

14. The unmanned driving device according to claim 13, wherein the fixing plate comprises: a fixed connection plate, a first bracket plate and a second bracket plate, the fixed connection plate is connected to the connection plate, the first bracket plate is located at one end of the fixed connection plate, the second bracket plate is located at the other end of the fixed connection plate, free ends of both the first bracket plate and the second bracket plate extend towards the support plate, an angle between the first bracket plate and the second bracket plate is greater than 90 degrees and smaller than 180 degrees, and the third antenna is a patch antenna and is attached onto the first bracket plate and the second bracket plate.

* * * * *